(12) United States Patent
Wood

(10) Patent No.: US 8,664,867 B1
(45) Date of Patent: Mar. 4, 2014

(54) ILLUMINATED WINDSHIELD WIPER

(76) Inventor: Sean Y. Wood, New York, NY (US)

( * ) Notice: Subject to any disclaimer, the term of this patent is extended or adjusted under 35 U.S.C. 154(b) by 299 days.

(21) Appl. No.: 13/082,817

(22) Filed: Apr. 8, 2011

Related U.S. Application Data

(60) Provisional application No. 61/321,939, filed on Apr. 8, 2010.

(51) Int. Cl.
*H05B 37/00* (2006.01)
*A47L 1/00* (2006.01)

(52) U.S. Cl.
USPC .............. 315/185 R; 15/250.43; 15/250.02; 15/250.13

(58) Field of Classification Search
USPC ....... 315/185 R; 15/250.43, 250.02, 250.001, 15/250.04, 250.13, 250.351; 340/576
See application file for complete search history.

(56) References Cited

U.S. PATENT DOCUMENTS

| | | | |
|---|---|---|---|
| 5,276,937 A | 1/1994 | Lan | |
| 5,305,190 A | 4/1994 | Clement | |
| 6,100,499 A * | 8/2000 | Davila, Sr. | 219/202 |
| 6,353,961 B1 | 3/2002 | Lin | |
| 6,742,913 B2 | 6/2004 | Deutsch | |
| 7,137,723 B2 | 11/2006 | Hwan | |
| 7,246,403 B2 | 7/2007 | Ohyama | |
| 2009/0273289 A1* | 11/2009 | Sun et al. | 315/185 S |

\* cited by examiner

*Primary Examiner* — Thienvu Tran
(74) *Attorney, Agent, or Firm* — Robert C. Montgomery; Montgomery Patent & Design

(57) ABSTRACT

A device by which windshield wiper arms on motor vehicles are provided with an illumination source is intended to increase vehicle visibility as well as create a unique visual effect at night. A motor vehicle equipped with the device comprises at least one illumination source or sources interconnected via wiring to a dash-mounted control box which provides a pair of switches to control the illumination of at least one illumination source.

16 Claims, 5 Drawing Sheets

ILLUMINATED WINDSHIELD WIPER

RELATED APPLICATIONS

The present invention was first described in and claims the benefit of U.S. Provisional Application No. 61/321,939 filed Apr. 8, 2010, the entire disclosure of which is incorporated herein by reference.

FIELD OF THE INVENTION

The present invention relates generally to automobile windshield wipers, and in particular, to an illuminating apparatus attached to an automobile windshield wiper.

BACKGROUND OF THE INVENTION

Safety is a foremost concern in the operation of personal motor vehicles. In particular, dark and wet conditions are some of the most hazardous conditions in which to operate vehicles, and a host of common vehicle features are geared particularly toward enhancing operation at night or in the rain. In particular, lights and windshield wipers, respectively, are the most common methods for combating these conditions.

One (1) problem with vehicle lights is that dark conditions in well-lit areas, vehicle headlights can be difficult to distinguish from surrounding lights. This problem is particular pronounced in foggy or rainy conditions where lights are impeded or reflected by the environment and can be difficult for oncoming vehicles to see. Windshield wipers are commonly utilized during these conditions, but this only provides better vision for the driver and not the oncoming vehicles.

Various attempts have been made to provide illuminated windshield wipers. Examples of these attempts can be seen by reference to several U.S. patents. U.S. Pat. No. 5,276,937, issued in the name of Lan, describes a windshield wiper pressure increasing and warning aid which includes forwardly directed warning lights connected to the windshield wiper circuit.

U.S. Pat. No. 5,305,190, issued in the name of Clement, describes an electro-luminescent strip attached to a wiper arm and powered by an automobile battery.

U.S. Pat. No. 6,100,499, issued in the name of Davila, Sr., describes a heated and lighted windshield wiper including an electrically conductive arm.

U.S. Pat. No. 6,353,961, issued in the name of Lin, describes a luminous body attached to a windshield wiper with a clamp and a base, for generating light when the wiper is turned on.

U.S. Pat. No. 7,137,723, issued in the name of Hwan, describes a decorative light including a press-in plate with an elongated opening adapted to attach to a windshield wiper or other location on a motor vehicle.

While these devices fulfill their respective, particular objectives, each of these references suffer from one (1) or more of the aforementioned disadvantages. Many such devices are not readily retrofitted to an existing vehicle. Also, many such devices do not provide a sufficient size or plurality of lights. Furthermore, many such devices are not modular or adjustable to accommodate a particular vehicle or a user's preferences. In addition, many such devices do not provide a range of aesthetic features. Moreover, many such devices are not selectively controllable during operation. Accordingly, there exists a need for illuminated windshield wipers without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for an illuminating device attachable to existing vehicle windshield wipers which provides a range of configurations, aesthetic features, and user controls. Thus, the object of the present invention is to solve the aforementioned disadvantages and provide for this need.

To achieve the above objectives, it is an object of the present invention to provide illumination for windshield wipers on motor vehicles to increase vehicle visibility as well as create a unique visual effect. The device comprises a plurality of illumination means each including a transparent or translucent protective enclosure, and a control box in electronic communication with the illumination means.

Another object of the present invention is to fasten each of the enclosures to an existing windshield wiper using a fastener such as an adhesive or a mechanical fastener. The enclosures and illumination means can be a variety of sizes, colors, and numbers and can be installed in a desired configuration and are interconnected with electrical wires and plugs.

Yet still another object of the present invention is to provide enclosures in a variety of shapes including alphanumeric characters such that the plurality of enclosures can provide a desired aesthetic function including spelling out words.

Yet still another object of the present invention is to enable a user to manually control the operation of the device while driving by using a control box in the interior of the vehicle. The control box is preferably mounted on the dashboard of the vehicle and includes a plurality of manual switches and control knobs.

Yet still another object of the present invention is to provide a variety of user selectable functionality operated by the control box including an on/off switch, selectable dimming, and a plurality of illumination functions including continuous illumination and variable speed blinking illumination.

Yet still another object of the present invention is to power the device by connection to either a vehicle power supply or a replaceable or rechargeable battery.

Yet still another object of the present invention is to enable the device to be connected to the vehicle's circuitry such that ignition of the vehicle or vehicle parking lamps automatically actuates the device.

Yet still another object of the present invention is to provide a method of installing the illumination means onto a windshield wiper, interconnecting a desired amount of strands of illumination means with the plugs and electrical wiring, connecting the wiring to the control box, operating the control box in a desired manner, and providing a selectable light pattern to illuminate and draw attention to the vehicle.

Further objects and advantages of the present invention will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY

| | |
|---|---|
| 10 | illumination means for a windshield wiper |
| 20 | illumination means |
| 25 | electrical wire |
| 26 | male plug |
| 27 | female plug |
| 30 | windshield wiper |
| 40 | enclosure |
| 45 | adhesive surface |
| 46 | enclosure aperture |
| 50 | illumination |
| 60 | control box |
| 61 | mounting ear |
| 62 | ear aperture |
| 63 | activation switch |
| 64 | tuning switch |
| 65 | indicia |
| 70 | battery |

DETAILED DESCRIPTION OF THE PREFERRED EMBODIMENT

In accordance with the invention, the best mode is presented in terms of a preferred embodiment, herein depicted within FIGS. 1 through 5. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Figure 1:
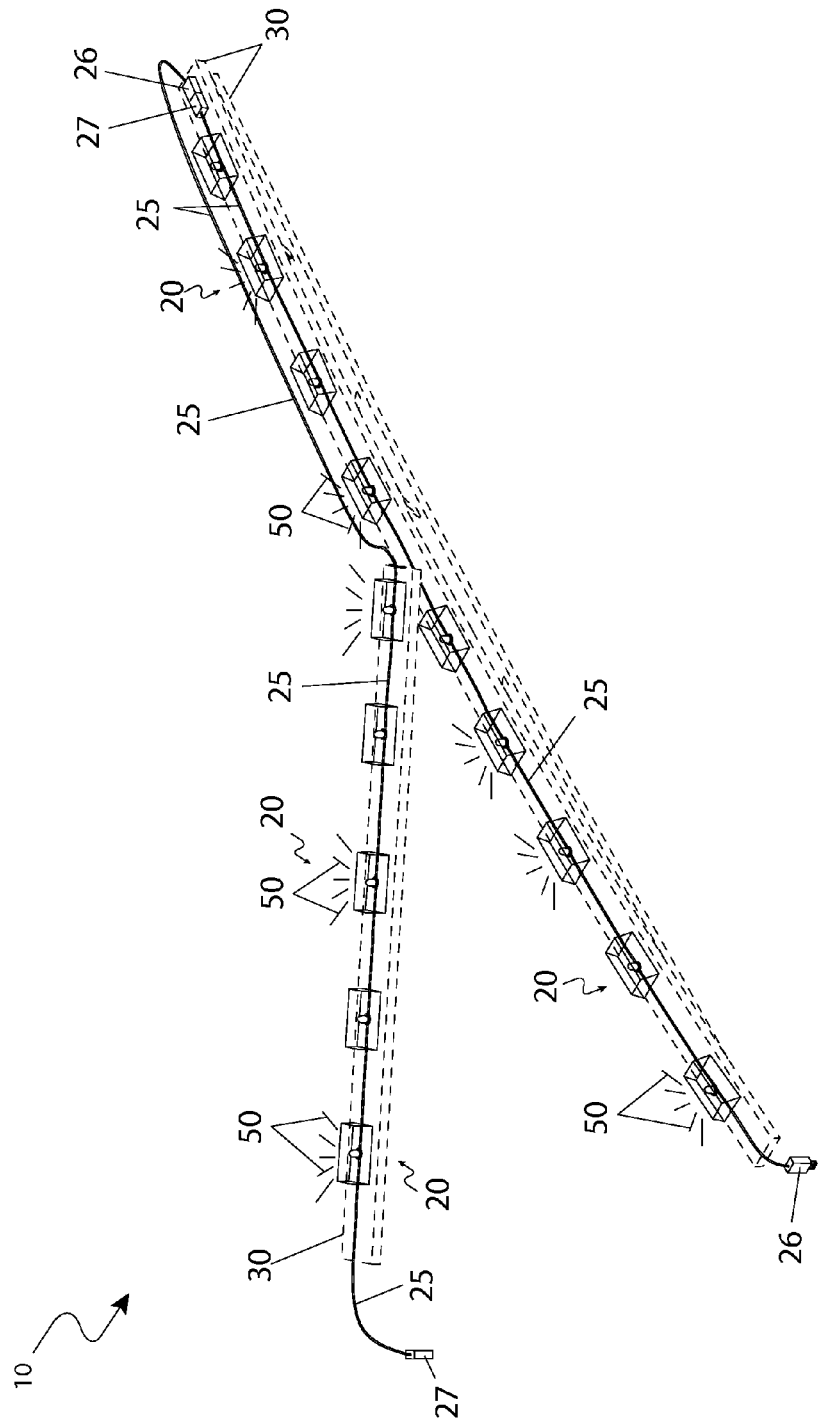
FIG. 1 is an environmental view of an illumination means for a windshield wiper 10, according to the preferred embodiment of the present invention.

The present invention describes a device that provides a means for windshield wipers 30 on motor vehicles to be selectively illuminated which is intended to increase vehicle visibility as well as create a unique visual effect, especially at night. Referring now to FIG. 1, an environmental view of the illumination means for windshield wipers 10, according to the preferred embodiment of the present invention, is disclosed. The illumination means for windshield wipers (herein described as the "device") 10 comprises a plurality of strung illumination means 20, a protective enclosure 40, and a control box 60. The device 10 would be made available in various lengths, multiple sizes, and styles to be able to be installed on various windshield wipers 30 from all makes and models of motor vehicles. The device 10 preferably is manufactured as a set which is in a predetermined length with a predetermined amount of illumination means 20. One (1) set is then utilized per windshield wiper 30 on the motor vehicle. The motor vehicles are herein described as being any vehicle which has a windshield and windshield wiper 30 associated therewith, such as a car, recreational vehicle, semi-truck, automobile, truck, van, snowmobile, and the like.

Figure 2:
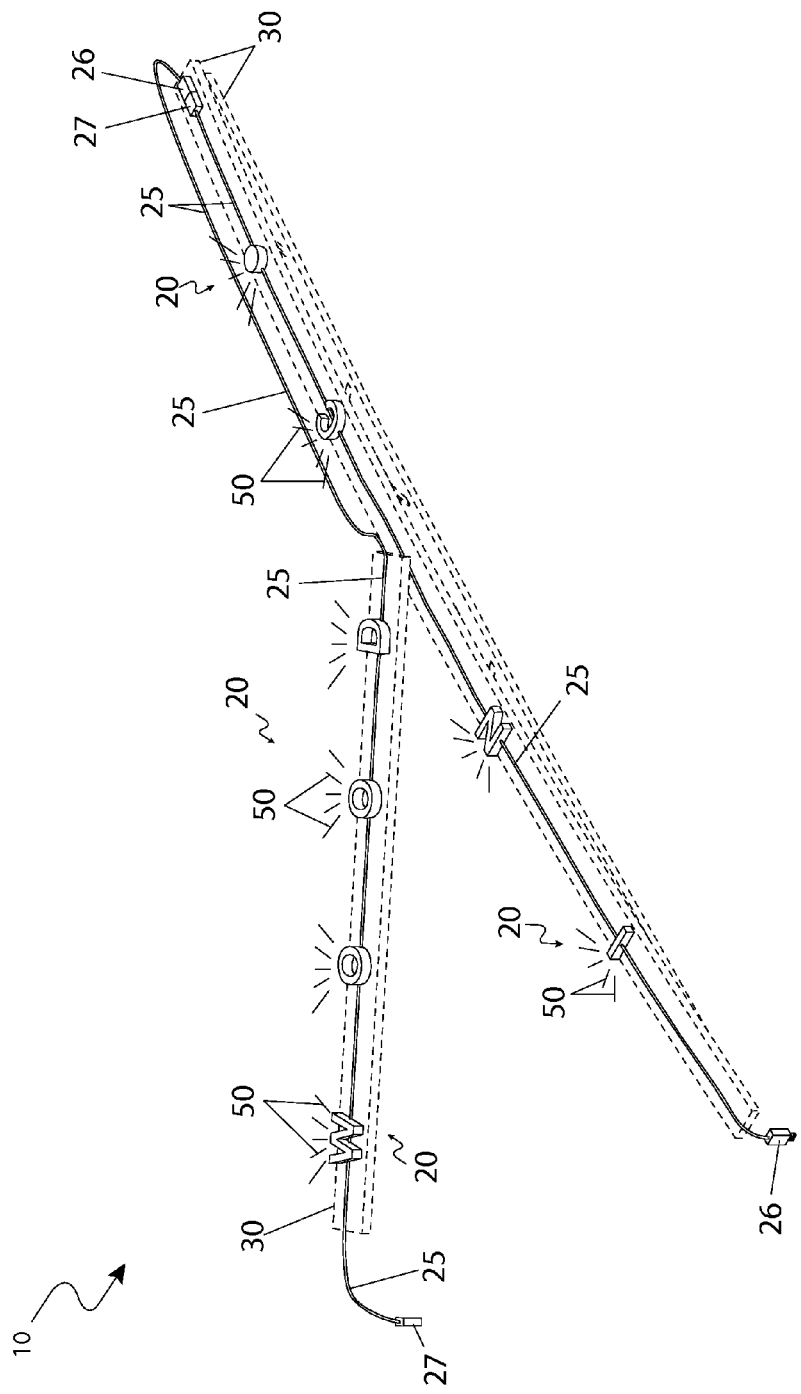
FIG. 2 is another environmental view of an illumination means for a windshield wiper 10, according to the preferred embodiment of the present invention.
Figure 3:
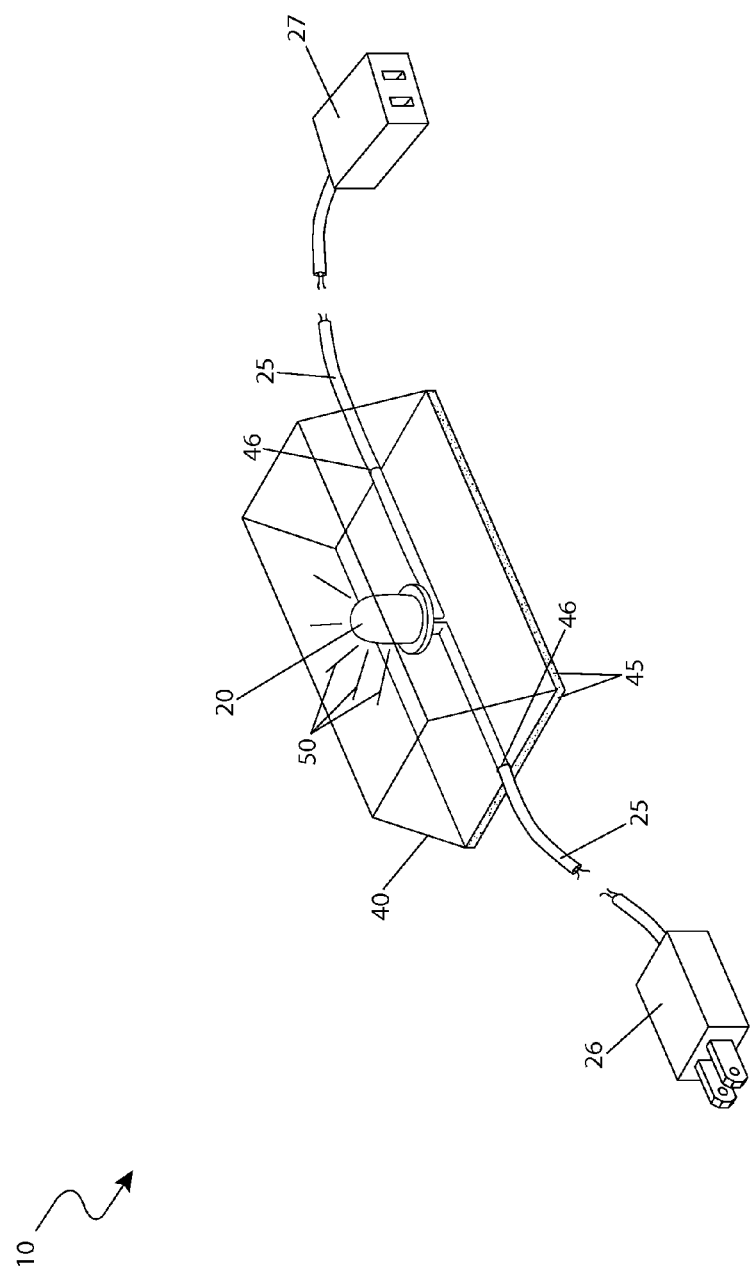
FIG. 3 is a perspective view of the illumination means for a windshield wiper 10, according to the preferred embodiment of the present invention.

Referring now to FIG. 2, another environmental view of the device 10 and FIG. 3, a perspective view of the device 10, according to the preferred embodiment of the present invention, are disclosed. The device 10 is comprised of a plurality of illumination means 20 which are individually enclosed by a respective enclosure 40 and interconnected with electrical wire 25 and plugs 26, 27. The illumination means 20 is positioned on the windshield wiper 30 to project an illumination 50 outwards towards the front of the motor vehicle such not to impair the driver's vision but to further enhance said vision, especially at night or in the rain. The illumination means 20 is preferably a light-emitting diode (LED), yet other illuminating devices may be utilized without limiting the scope of the device 10. The illumination means 20 preferably permits a continuous illumination 50 whenever the power is applied, yet may also flash or blink in a sequence which is desired by the manufacturer. Further, the illumination means 20 may be of one (1) or alternatively be of various colors simultaneously. For example, the illumination means 20 may be a single color such as blue or multiple colors such as blue, red, and yellow simultaneously. These colors were given as illustrative purposes only, and are not meant to limit the illumination means 20 to just these colors.

The enclosure 40 which protects the illumination means 20 from debris and weather effects is depicted herein as comprising a generally trapezoidal-shape for illustration purposes only, it is known that other shapes such as alphanumeric characters (as shown in FIG. 2) which are utilized to spell out words, graphic designs, or patterns may be utilized without limiting the scope of the device 10. The protective enclosure 40 fully encloses the illumination means 20 and would be fabricated in a layered extrusion process fabricated of a synthetic or plastic that is transparent or translucent so that the illumination 50 may be readily seen and said illumination means 20 may be protected from the weather elements. A bottom surface of the enclosure 40 is comprised of an adhesive surface 45 which enables an attachment to the windshield wiper 30. Opposing side surfaces of the enclosure 40 comprise an enclosure aperture 46 which routes the electrical wiring 25 to an adjacent enclosure 40 and illumination means 20 or a male plug 26 or a female plug 27. The enclosure aperture 46 is preferably sealed to prohibit debris and fluid from penetrating the enclosure 40. Each end of the strand of illumination means 20 comprises either a male plug 26 or a female plug 27 which enables interconnection to another strand and also enables replacement of a damaged strand as necessary. Each plug 26, 27 to preferably a common waterproof electrical connection.

Figure 4:
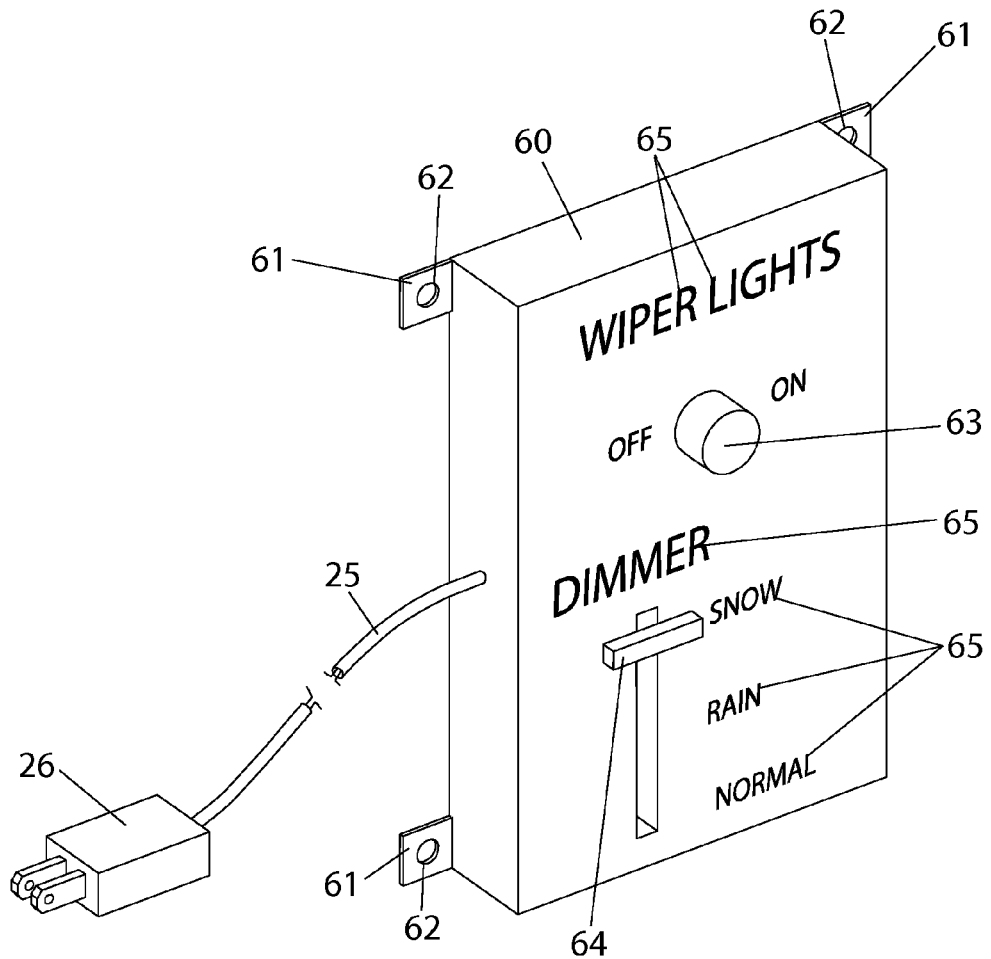
FIG. 4 is a perspective view of a control box 60, according to the preferred embodiment of the present invention; and, FIG. 5 is an electrical block diagram of illumination means for a windshield wiper 10, according to the preferred embodiment of the present invention.

Referring now to FIG. 4, a perspective view of the control box 60, according to the preferred embodiment of the present invention, is disclosed. Electrical wiring 25 from each illumination means 20 is interconnected to a control box 60 via a desired plug 26, 27. Although the control box 60 is depicted herein as comprising a male plug 26 it is known that a female plug 27 may also be utilized without limiting the scope of the apparatus 10. The control box 60 is preferably mounted on the dash of the motor vehicle or any other suitable locations that would be within easy reach to the driver or passenger. The control box 60 is depicted herein as a six-sided generally rectangular digitally-manipulated structure which is utilized to activate/deactivate the illumination 50 and also to manipulate the intensity of the illumination 50.

Each rear corner edge of the control box 60 comprises a mounting ear 61 which further includes an ear aperture 62 to mount said control box 60 onto a desired surface within the motor vehicle. A desired mechanical fastener is inserted into each ear aperture 62 and mounting surface to secure the control box 60 in a desired position. Other attachment means such as adhesive may also be utilized to attach the control box 60 to the desired mounting surface without limiting the scope of the device 10.

A front surface of the control box 60 comprises an activation switch 63 and a tuning switch 64. The activation switch 63 activates or deactivates the illumination means 20 by enabling or prohibiting current to be sent to said illumination means 20 (also see FIG. 5). The activation switch 63 is depicted herein as being comprised of a knob, yet other switching devices may be utilized without limiting the scope of the device 10. The tuning switch 64 enables the amount of activated illumination means 20 to be manipulated which correspondingly increases or decreases the intensity of the illumination 50. The tuning switch 64 is particularly useful during various driving conditions such as snowing or raining conditions in which a less intense illumination 50 would be desired. The tuning switch 64 is depicted herein as a sliding switch, yet it is known that other switching devices may be utilized without limiting the scope of the device 10. Each switch 63, 64 is also accompanied with corresponding indicia 65 which pertains to the desired activity of said switch 63, 64. The indicia 65 may be imprinted, engraved, or the like onto the front surface of the control box 60.

Figure 5:
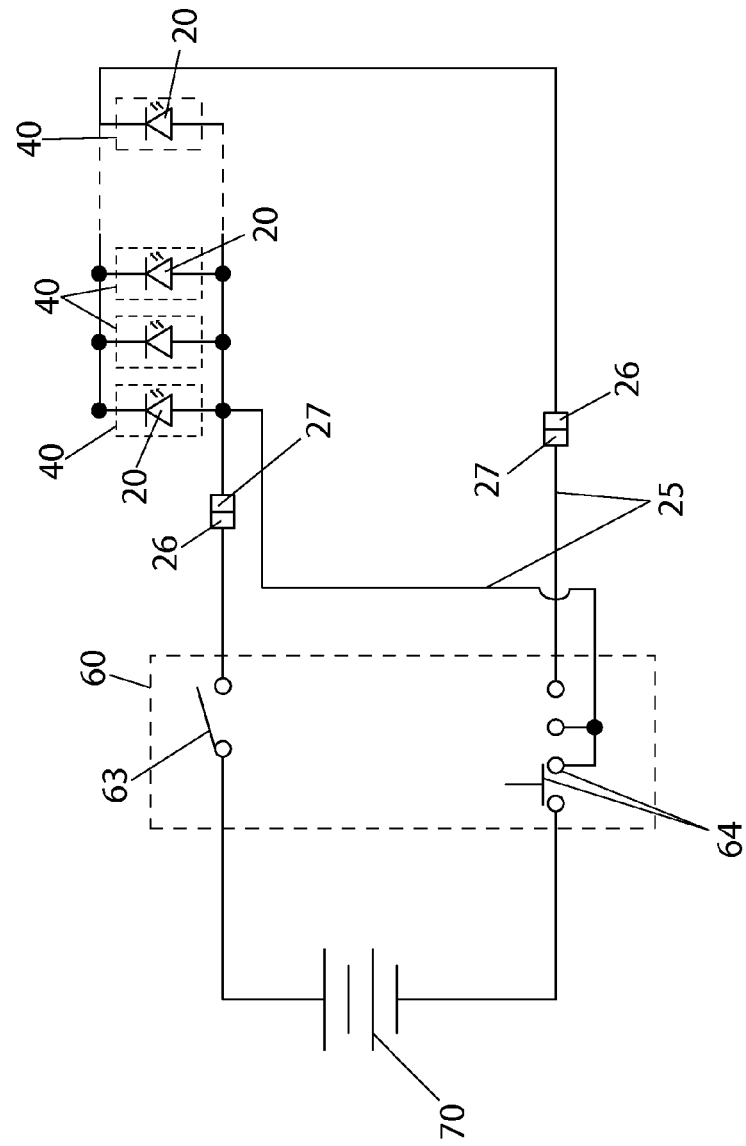

Referring now to FIG. 5, an electrical block diagram of the device 10, according to the preferred embodiment of the present invention, is disclosed. Power is transmitted to the device 10 via a battery 70. The battery 70 is preferably a common user replaceable or chargeable current source which is accessed from an internal portion of the control box 60, yet said battery 70 may be provided by the motor vehicles existing battery. Power from the battery 70 is routed to the activation switch 63 which activates or deactivates the illumination means 20. Once the illumination means 20 are activated power is received by the tuning switch 64 which manipulates the amount of illumination means 20 which are illuminating. Appropriately gauged electrical wire 25 and plugs 26, 27 are utilized to interconnect the battery 70 to the switches 63, 64 and to the illumination means 20. The electrical wire 25 of the device 10 would be of sufficient length to allow the typical oscillation motion of the windshield wipers 30 without disconnecting from the power source or the illumination means 20.

The illumination means 20 could be in electrical communication with an internal circuitry of the motor vehicle such as the parking lamp circuit for example, such that the illumination means 20 would be activated whenever the parking lamps are illuminated or integrated into the electrical system of the motor vehicle through utilization of the vehicle battery such that whenever the ignition is turned through the motion of the vehicle key, power is supplied to the device 10.

The preferred embodiment of the present invention can be utilized by the common user in a simple and effortless manner with little or no training. After initial purchase or acquisition of the apparatus 10, it would be configured as indicated in FIG. 1.

The method of utilizing the apparatus 10 may be achieved by performing the following steps: acquiring the device 10; installing the illumination means 20 onto the windshield wiper 30 via engaging the adhesive surface 45 with a surface of said windshield wiper 30; interconnecting a desired amount of strands of illumination means 20 via engaging the plugs 26, 27; routing the electrical wiring 25 to the control box 60 and interconnecting via engaging the plugs 26, 27; positioning the activation switch 63 to an activated position to allow electrical power flow to transmit to the illumination means 20; positioning the tuning switch 64 to a desired position; positioning the activation switch 63 to a deactivated position to terminate the electrical power to the illumination means 20; repeating as desired; and, providing a unique and novel way to illuminate and draw attention to one's vehicle.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. An illumination means adapted to be attachable to a wiper arm of an automobile, comprising:
    a light string having a first end and a second end comprising a waterproof electrical connection for interconnecting an adjacent light string;
    a plurality of lamps in electrical communication with said light string;
    a plurality of enclosures each protecting and surrounding each of said plurality of lamps, each comprising:
        a resilient transparent or translucent plastic body;
        an adhesive on a bottom surface of said body for removably attaching each enclosure to said wiper arm;
        a pair of enclosure apertures located on opposing side walls of said body for permitting the passage of said light string; and,
        a seal around said pair of enclosure apertures for protecting a lamp residing therein; and,
    a control means in electrical communication with said first end of said light string and in electrical communication with a power source located within said control means;
    wherein said plurality of enclosures are adapted to be removably attached to said wiper arm;
    wherein said plurality of lamps are positioned to project illumination outward from said automobile;
    wherein said plurality of lamps and said plurality of enclosures are equidistantly spaced from each other along said light string; and,
    wherein said plurality of lamps are controlled by said control means.

2. The illumination means of claim 1, wherein said plurality of lamps each comprise a light-emitting diode.

3. The illumination means of claim 1, wherein said plurality of lamps further comprises a single color.

4. The illumination means of claim 1, wherein said plurality of lamps further comprises multiple differing colors.

5. The illumination means of claim 1, wherein said resilient body further comprises an alphanumeric design.

6. The illumination means of claim 1, wherein said control means comprises a control box mounted within an interior of said automobile, further comprising an activation switch and a tuning switch in electrical communication with said power source;
    wherein said activation switch selectively energizes and de-energizes said light string from said power source; and,
    wherein said tuning switch selectively manipulates the intensity of the output of the plurality of lamps.

7. The illumination means of claim 6, wherein said plurality of lamps either illuminate continuously, intermittently, or sequentially when energized by said control means.

8. An illumination means adapted to be attachable to a wiper arm of an automobile, comprising:
    a light string having a first end and a second end comprising a waterproof electrical connection for interconnecting an adjacent light string;
    a plurality of lamps in electrical communication with said light string;
    a plurality of enclosures each protecting and surrounding each of said plurality of lamps, each comprising:
        a resilient transparent or translucent plastic body;
        an adhesive on a bottom surface of said body for removably attaching each enclosure to said wiper arm;
        a pair of enclosure apertures located on opposing side walls of said body for permitting the passage of said light string; and,
        a seal around said pair of enclosure apertures for protecting a lamp residing therein; and,
    a control means in electrical communication with said first end of said light string and in electrical communication with a power source located on-board said automobile;
    wherein said plurality of enclosures are adapted to be removably attached to said wiper arm;
    wherein said plurality of lamps are positioned to project illumination outward from said automobile;
    wherein said plurality of lamps and said plurality of enclosures are equidistantly spaced from each other along said light string; and,
    wherein said plurality of lamps are controlled by said control means.

9. The illumination means of claim 8, wherein said plurality of lamps each comprise a light-emitting diode.

10. The illumination means of claim 9, wherein said plurality of lamps further comprises a single color.

11. The illumination means of claim 9, wherein said plurality of lamps further comprises multiple differing colors.

12. The illumination means of claim 9, wherein said control means comprises a control box mounted within an interior of said automobile, further comprising an activation switch and a tuning switch in electrical communication with said power source;
    wherein said activation switch selectively energizes and de-energizes said light string from said power source; and,
    wherein said tuning switch selectively manipulates the intensity of the output of the plurality of lamps.

13. The illumination means of claim 12, wherein said plurality of lamps either illuminate continuously, intermittently, or sequentially when energized by said control means.

14. The illumination means of claim 9, wherein said power source further comprises an automobile battery;
    wherein said illumination means is energized concurrently with activation of an ignition circuit.

15. The illumination means of claim 14, wherein said illumination means is in electrical communication with an internal parking lamp circuitry of said automobile;
    wherein said illumination means is energized concurrently with operation of said parking lamp circuitry.

16. The illumination means of claim 8, wherein said resilient body further comprises an alphanumeric design.

* * * * *